(12) United States Patent
Naeyaert

(10) Patent No.: US 11,976,474 B2
(45) Date of Patent: May 7, 2024

(54) FLOOR PANEL AND METHOD FOR MANUFACTURING FLOOR PANELS

(71) Applicant: UNILIN, BV, Wielsbeke (BE)

(72) Inventor: Christophe Naeyaert, Jabbeke (BE)

(73) Assignee: UNILIN BV, Wielsbeke (BE)

( * ) Notice: Subject to any disclaimer, the term of this patent is extended or adjusted under 35 U.S.C. 154(b) by 245 days.

(21) Appl. No.: 16/578,644

(22) Filed: Sep. 23, 2019

(65) Prior Publication Data

US 2020/0018078 A1    Jan. 16, 2020

Related U.S. Application Data

(63) Continuation of application No. 15/322,795, filed as application No. PCT/IB2015/054964 on Jul. 1, 2015, now Pat. No. 11,655,638.

(30) Foreign Application Priority Data

Jul. 4, 2014   (BE) .................................. 2014/0517

(51) Int. Cl.
*E04F 15/10*  (2006.01)
*B32B 3/06*  (2006.01)
(Continued)

(52) U.S. Cl.
CPC .............. *E04F 15/107* (2013.01); *B32B 3/06* (2013.01); *B32B 5/022* (2013.01); *B32B 27/08* (2013.01); *B32B 27/20* (2013.01); *B32B 27/22* (2013.01); *B32B 27/304* (2013.01); *E04F 15/02038* (2013.01); *E04F 15/102* (2013.01); *E04F 15/105* (2013.01); *B29C 2043/483* (2013.01); *B32B 2262/101* (2013.01); *B32B 2264/10* (2013.01); *B32B 2307/412* (2013.01); *B32B 2307/75* (2013.01); *B32B 2471/00* (2013.01); *E04F 2201/0153* (2013.01); *E04F 2201/023* (2013.01)

(58) Field of Classification Search
CPC ....................................................... E04F 15/10
See application file for complete search history.

(56) References Cited

U.S. PATENT DOCUMENTS 3,360,422 A   12/1967 Desch
3,619,229 A   11/1971 Hartlein
(Continued)

FOREIGN PATENT DOCUMENTS

EP   1 938 963   7/2008
EP   2 339 092   6/2011
(Continued)

OTHER PUBLICATIONS

International Search Report dated Oct. 16, 2015 in International (PCT) Application No. PCT/IB2015/054964.
(Continued)

*Primary Examiner* — Andrew T Piziali
(74) *Attorney, Agent, or Firm* — Wenderoth, Lind & Ponack, L.L.P.

(57) ABSTRACT

A floor panel includes at least a substrate and a decor provided thereon. The substrate consists essentially of thermoplastic material and/or filler materials. The substrate encloses one or more glass fiber cloths. The total weight of the one or more glass fiber cloths is more than 85 grams per square meter.

16 Claims, 2 Drawing Sheets

(51) Int. Cl.
  *B32B 5/02* (2006.01)
  *B32B 27/08* (2006.01)
  *B32B 27/20* (2006.01)
  *B32B 27/22* (2006.01)
  *B32B 27/30* (2006.01)
  *E04F 15/02* (2006.01)
  *B29C 43/48* (2006.01)

(56) References Cited

U.S. PATENT DOCUMENTS

| | | | |
|---|---|---|---|
| 4,138,521 A | 2/1979 | Brown | |
| 4,698,258 A | 10/1987 | Harkins, Jr. | |
| 4,794,020 A * | 12/1988 | Lussi | B05D 3/12 |
| | | | 156/62.2 |
| 4,923,658 A * | 5/1990 | Hover | B29B 17/00 |
| | | | 264/115 |
| 5,059,474 A | 10/1991 | Yoshida | |
| 5,084,501 A | 1/1992 | Drout et al. | |
| 5,112,671 A | 5/1992 | Diamond et al. | |
| 5,747,133 A | 5/1998 | Vinod et al. | |
| 6,306,318 B1 | 10/2001 | Ricciardelli et al. | |
| 8,367,764 B2 | 2/2013 | Lavallee et al. | |
| 2007/0293646 A1* | 12/2007 | Gosse | C08K 5/0016 |
| | | | 526/344 |
| 2008/0289289 A1* | 11/2008 | Wiercinski | C09J 7/29 |
| | | | 52/745.06 |
| 2010/0129593 A1* | 5/2010 | Rempt | C08L 33/02 |
| | | | 428/95 |
| 2010/0201025 A1 | 8/2010 | Georges et al. | |
| 2011/0138722 A1 | 6/2011 | Hannig | |
| 2011/0263174 A1* | 10/2011 | Ketzer | B32B 27/04 |
| | | | 442/327 |
| 2012/0128946 A1 | 5/2012 | Kwon et al. | |
| 2012/0266555 A1* | 10/2012 | Cappelle | B32B 27/08 |
| | | | 52/309.1 |
| 2013/0067842 A1 | 3/2013 | Meersseman et al. | |
| 2013/0104485 A1 | 5/2013 | Meersseman et al. | |
| 2013/0183506 A1 | 7/2013 | Vermeulen | |
| 2015/0167319 A1 | 6/2015 | Segaert et al. | |

FOREIGN PATENT DOCUMENTS

| | | |
|---|---|---|
| GB | 1 248 060 | 9/1971 |
| JP | 6-4243 | 1/1994 |
| JP | 6-64108 | 3/1994 |
| JP | 2000-71394 | 3/2000 |
| JP | 2004-116004 | 4/2004 |
| JP | 2007-77568 | 3/2007 |
| JP | 6149063 | 6/2017 |
| JP | 6330534 | 5/2018 |
| JP | 6340055 | 6/2018 |
| WO | 2010/023042 | 3/2010 |
| WO | 2011/141849 | 11/2011 |
| WO | 2012/004701 | 1/2012 |
| WO | 2013/118030 | 8/2013 |
| WO | 2013/179261 | 12/2013 |
| WO | 2015/170274 | 11/2015 |
| WO | 2015/173743 | 11/2015 |
| WO | 2016/113379 | 7/2016 |

OTHER PUBLICATIONS

Written Opinion of the International Searching Authority dated Oct. 16, 2015 in International (PCT) Application No. PCT/IB2015/054964.

Communication pursuant to Article 94(3) EPC dated Jul. 25, 2023 in European Patent Application No. 22 200 175.2.

* cited by examiner

FLOOR PANEL AND METHOD FOR MANUFACTURING FLOOR PANELS

BACKGROUND OF THE INVENTION

1. Field of the Invention

This invention relates to panels for forming a floor covering, as well as to a method for manufacturing such panels.

More particularly, the invention relates to panels which comprise at least a layer, more particularly a substrate layer, of thermoplastic material. Further, such panels may also comprise above said layer at least a top layer with a printed decor and a translucent or transparent wear layer.

In particular, the present invention relates to panels of the type which, on two or more opposite edges, comprises coupling means or coupling parts with which two of such floor panels can be coupled at the respective edges, such that they are locked together in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are connected to each other at their edges, however, are resting freely on the underlying surface. However, it is not excluded to apply the invention to panels which are intended for gluing onto the underlying surface and which possibly are made with straight edges, thus, without coupling parts.

2. Related Art

Such panels are known, for example, from EP 1 938 963, EP 2 339 092 A1 and WO 2010/023042. From these documents, more particularly vinyl-based floor panels are known for forming a floating floor covering. Such vinyl-based floor panels mostly have a thickness of 3 to 5 millimeters and have a high material density. The core of the panels respectively is made of one or more prefabricated layers of thermoplastic material, for example, soft PVC. Above the print, a transparent thermoplastic layer and possible a superficial lacquer layer are provided. The various layers are adhered to each other by means of a thermal lamination process. According to EP 2 339 092 A1, a reinforcing layer on the basis of glass fiber may be applied.

The panels of the state of the art show the disadvantage that they are strongly subjected to shrinkage and expansion, or possibly even warping, under the influence of temperature. Shrinkage and expansion may lead to upsetting of the floor panel or the individual panels and, for example, to the mutual release of the coupling parts or to the individual panels moving apart, which may lead to gaps. The features of the panels of the state of the art are such that problems may arise already with becoming warm due to incident sunlight, for example, at a window in a room.

From WO 2012/004701, it is known to apply a glass fiber layer or embedded profiles in order to increase the dimensional stability of such panels. In particular, the bending stiffness of the panels has been addressed here.

U.S. Pat. No. 6,306,318 describes a method for recycling discarded carpets, wherein, starting from a molten mixture of a recyclate on the basis of discarded carpets and fresh soft PVC, flexible floor tiles having a minimum thickness of 5 millimeters are produced by means of an injection molding process. As an alternative for the recyclate of discarded carpets, recyclate of glass fiber-reinforced synthetic material (English: fiberglass) may also be applied. The obtained tile is relatively hard and the flexibility leaves much to be desired. This may lead to problems with the footfall sound during use and to a disability of adapting to unevenness of the underlying surface. The injection-molded tile comprises coupling means along the edges, however, these do not provide for a locking in vertical direction. Moreover, the precision of injection molding is inferior, in particular in the case of soft thermoplastic materials. This method is time-consuming and moreover there is little possibility of variation in the appearance of the usage side of the tiles. Such tiles possibly still show a strong dimensional alteration due to temperature changes.

GB 1 248 060 describes, as an alternative to a method similar to that of U.S. Pat. No. 6,306,318, the possibility of manufacturing reinforced thermoplastic materials by means of a method wherein continuous fiber layers and thermoplastic granulate layers are stacked alternatingly and pressed in a mold. According to the examples, hard PVC can be used as the thermoplastic material. This document in first instance relates to increased bending stiffness of the obtained thermoplastic material. This method, too, is time-consuming and offers little possibility for variation in the appearance of the obtained materials.

From WO 2013/179261, a method for manufacturing such panels is known wherein a glass fiber layer is enclosed between two strewn and pressed granulate layers. By means of this method, an improved enclosure of the glass fiber layer in the substrate material is obtained. However, the dimensional stability of the obtained panels still leaves much to be desired.

From US 2012/128,946, a thin wall-to-wall floor covering is known, on the basis of biodegradable resins. With the intention of obtaining increased dimensional stability, this floor covering comprises a reinforcement cloth of 20 to 120 grams per square meter. The reinforcement cloth is situated between the substrate and a print layer forming the decor. With higher weights, there is a risk of delamination.

SUMMARY OF THE DISCLOSURE

The present invention relates to an alternative panel, which in first instance is intended as a floor panel for forming a floating floor covering. According to various preferred embodiments of the invention, also a solution is offered for one or more problems with the panels of the state of the art.

The present invention, each time in an independent manner, relates to various possible measures, which, each individually or in a combination of two or more of those measures, may result in an improved dimensional stability in a floor panel having a substrate which substantially consists of thermoplastic material and/or filler materials. These various independent aspects of the invention are defined below.

According to a first possible measure, and a first independent aspect, the substrate encloses one or more glass fiber cloths, wherein the total weight of glass fiber cloths is more than 85 grams per square meter.

According to a second possible measure, and a second independent aspect, the substrate encloses one or more glass fiber cloths, wherein at least one of said glass fiber cloths is or are covered with a thermosetting material.

According to a third possible measure, and a third independent aspect, the substrate encloses at least two directly interlinked glass fiber cloths.

According to a fourth possible measure, and a fourth independent aspect, the substrate encloses one or more glass fiber cloths, wherein at least one of said glass fiber cloths is enclosed in a substrate portion which comprises a locally higher amount of plasticizer.

According to a fifth possible measure, and a fifth independent aspect, the substrate encloses one or more glass fiber cloths, wherein at least one of said glass fiber cloths is enclosed in or borders a substrate portion which is obtained by means of hardening a plastisol.

According to a sixth possible measure, and a sixth independent aspect, the filler material substantially consists of limestone.

Said "enclosing" preferably relates to a situation wherein the substrate extends at least on both sides of the respective glass fiber cloth, or in other words a situation, wherein the glass fiber cloth is embedded in the substrate material. As the respective glass fiber cloth, according to a plurality of the above-mentioned possible measures, is "enclosed", preferably embedded, the risk of delamination is strongly diminished. Preferably, the substrate material also extends through the respective glass fiber cloth.

Preferably, the substrate comprises a glass fiber cloth of the non-woven type, wherein this glass fiber cloth has a weight between 100 and 180 grams per square meter, and still better between 120 and 150 grams per square meter. Preferably, the substrate comprises only one glass fiber cloth. Enclosing, still better embedding, at least one heavy glass fiber cloth is particularly useful with floor panels which are intended for floating placement. Such panels preferably have a thickness of more than three millimeters, a length of 1.2 to 2.5 meters and a width of 0.1 to 0.3 meters. With such floor panels, the shrinkage or extension with changing temperatures may be high. This dimensional change must be compensated, amongst others, by the connections between adjacent floor panels, in particular by the coupling means which are present on the edges. A heavy glass fiber cloth may locally reinforce the coupling means in a considerable manner.

Preferably, the glass fiber cloth, or at least one of said glass fiber cloths, is situated outward of the center line of said substrate, preferably at a distance larger than one fifth of the thickness of the substrate. Preferably, the glass fiber cloth is situated within the thickness of the substrate, namely at less than half of the thickness of the center line, such that it is embedded in the substrate.

Preferably, the glass fiber cloth, or at least one of said glass fiber cloths, is covered with a thermosetting material, such as with melamine-, phenol- and/or urea-containing synthetic material, for example, with melamine formaldehyde, phenol formaldehyde, urea formaldehyde, melamine urea formaldehyde. Hereby, an example is obtained of the also above-mentioned second possible measure. Other examples comprise covering with alkyd resins, polyester resins, epoxy resins or polyurethane of the thermosetting type. The covering with a thermosetting material restricts or prevents orientation of the glass fibers in expansion direction. Hereby, the glass fiber cloth is more effective even with relatively limited temperature increases or dimensional changes. Instead of a thermosetting material, a thermoplastic material may also be applied as a stabilizing coating of the glass fiber cloth, wherein such thermoplastic material then shows a higher glass transition temperature than the thermoplastic material of the substrate. Preferably, the glass transition material of the coating material is at least 20° higher than the glass transition temperature of the substrate material. In the case of a polyvinyl chloride (PVC)-containing substrate having a typical glass transition around 80° C., preferably a thermoplastic material is applied with a glass transition temperature which is higher than 100° C., such as polymethyl methacrylate (PMMA), polytetrafluoroethylene (PTFE), acrylonitrile butadiene styrene (ABS), polynorbornene or polycarbonate. Providing such stabilizing coating material on a glass fiber cloth, whether woven or non-woven, as such forms an independent inventive aspect of the present invention. Preferably, such coating material is applied for a non-woven or glass fiber fleece, as there the alignment effect of the fibers is larger.

Preferably, the substrate substantially consists of a strewn and pressed granulate of said thermoplastic material and/or filler materials. Enclosing a heavy glass fiber cloth according to said first possible measure, in practice can be performed very smoothly by means of the method described in WO 2013/179261.

Preferably, the thermoplastic material of the substrate has a glass transition temperature of less than 100° C.

Preferably, the thermoplastic material of the substrate relates to polyvinyl chloride with an amount of plasticizer of higher than 12% or even higher than 20% in the mixture of PVC and plasticizer. These weight percentages thus do not take into account the weight of the glass fiber cloths and the possible filler materials. According to other possibilities, the thermoplastic material of the substrate relates to polypropylene (PP), polyethylene (PE) or polyethylene terephthalate (PET). In all cases, including the case wherein the thermoplastic material is PVC, a portion of the respective substrate material may consist of recycled material.

Preferably, said filler materials comprise chalk and/or limestone. The inventor has found that the use of limestone is more effective. The particles of limestone are larger and more angular and lead to a better anchoring in the thermoplastic material of the substrate. The use of limestone as a filler material in a thermoplastic substrate as such forms an independent inventive aspect defined in said sixth possible measure.

Preferably, said filler materials form at least 40 percent by weight, or still better more than 50 percent by weight, of the substrate material. It is possible to provide 65 or 70 percent by weight or more of the filler material in the substrate material.

According to a particular possibility, the substrate may enclose at least two glass fiber cloths directly interlinked, such as, for example, a woven and a non-woven glass fiber layer. According to this example, the woven glass fiber layer or the glass fiber net can limit the orientation of the glass fibers in the non-woven glass fiber layer, such that, globally seen, an improvement of the dimensional stability of the panel is obtained. The use of two directly interlinked glass fiber cloths in a thermoplastic substrate as such forms an inventive independent aspect of the present invention and is defined in the third possible measure mentioned above. By "directly interlinked" is meant that the material of these layers is hooked into each other and/or their respective coating layers merge into each other and/or that they are interlinked in another manner than solely by the thermoplastic material of the substrate. For the two directly interlinked glass fiber cloths, two woven glass fiber cloths or glass fiber nets may also be applied, wherein those then preferably are interlinked in such a manner that their production directions are perpendicular to each other. In this manner, a direction-independent limitation of dimensional changes can be obtained.

According to another particular possibility, the glass fiber cloth, or at least one of said glass fiber cloths, is situated in a substrate portion substantially consisting of polyvinyl chloride, wherein this substrate portion comprises a locally higher amount of plasticizer, for example, at least 5 percent by weight, or even at least 10 percent by weight, more than in other substrate layers, wherein these weight percentages do not take into account the percentage of filler material or the weight of the glass fiber cloths. The inventor has found that the glass fiber cloth in such case has a better grip on the thermoplastic material and that the dimensional stability of the panel, globally seen, improves. Applying a glass fiber cloth in a substrate layer with a locally higher amount of plasticizer as such forms an independent aspect of the invention, as defined in the also above-mentioned fourth possible measure.

According to another particular possibility, the substrate can be obtained at least partially by hardening a plastisol, preferably a suspension of PVC particles in liquid plasticizer. Preferably, the substrate encloses one or more glass fiber cloths, wherein at least one of said glass fiber cloths is enclosed in or borders a substrate portion which is obtained by means of hardening such plastisol. In this manner, an embodiment according to the earlier-mentioned fifth possible measure and/or the preferred embodiments thereof can be obtained. Such embodiment leads to an excellent adherence of the respective glass fiber cloth in the substrate material, also when such glass fiber cloth has a weight of 100 grams per square meter or more, or of 120 grams per square meter or more. Preferably, the substrate material on the other side of the glass fiber cloth relates to a substrate layer which is obtained by means of extrusion or by strewing and pressing of granulate. In this manner, when manufacturing the floor panel, it can be provided for that the plastisol penetrates into the glass fiber cloth up to the relatively harder substrate material on the other side of the glass fiber cloth to which it can adhere. The present particular possibility also relates to an example of a further independent aspect of the present invention. To this aim, the invention, in an independent manner, relates to a method for manufacturing floor panels, wherein these floor panels comprise a substrate and a decor provided thereon and said substrate substantially consists of thermoplastic material and/or filler materials, wherein the method comprises at least the following steps:

- the step of providing a first substrate layer at least by strewing granulate which comprises said thermoplastic material, and/or by providing a solid substrate layer, which comprises said thermoplastic material;
- the step of providing a glass fiber cloth on said first substrate layer;
- the step of providing a plastisol on said glass fiber cloth;
- the step of providing said decor, either by directly printing the substrate, or by applying a printed carrier, for example, a decor film.
- According to such method, a floor panel can be obtained showing said fifth measure. It is evident that the floor panels which are obtained by means of such method may or may not further show the characteristics of the first, second, third, fourth and/or sixth measure herein above and/or the preferred embodiments hereof. When use is made of a first substrate layer of strewn granulate, this preferably is consolidated and/or pressed, in such a manner that a coherent substrate layer is obtained before the glass fiber cloth is applied. However, it is not excluded that the glass fiber cloth is subjected to such consolidating or pressing together with the first substrate layer. Preferably, the surface of the first substrate layer remains somewhat porous and/or rough, such that said plastisol can adhere to this surface simply across the glass fiber cloth. The roughness of the surface may be, for example, 10 micrometers $R_a$ or more. Preferably, said plastisol has a low viscosity, preferably a plastisol with a K value of 80 or lower. A low viscosity promotes the adherence or embedding of the glass fiber cloth. Preferably, the plastisol comprises 20 percent by weight or more of a plasticizer, such as a phthalate-based plasticizer or DINCH (Di-isononyl-1,2-cyclohexane dicarboxylate).

The present invention, according to all its independent aspects or measures, shows its advantages primarily when it is applied with floor panels which substantially are made of supple or soft synthetic material, or, in other words, with supple panels.

By supple panels, panels are meant which, when, in the case of a rectangular panel having, for example, a width of less than 50 centimeters, they are fixedly clamped on one of the two short sides of the panel and herein protrude over a length of 100 centimeters and are not supported, the panels will bend under the influence of their own weight, wherein this bending at the height of the free extremity is at least 10 centimeters in respect to the clamped extremity. For this bending, a bending time of 10 seconds is taken into account, and wherein the panel starts from a flat horizontal position.

The present invention further shows its advantages in particular when it is applied with floor panels of the type which generally is indicated by the English term of "Resilient floor panels". Among this type of floor panels resorts, amongst others, a vinyl panel, more particularly a so-called vinyl tile, and in particular a panel of the so-called LVT type ("Luxury Vinyl Tile"). Herein, this mostly relates to panels of so-called soft PVC (Polyvinyl Chloride), which usually is manufactured of PVC in which plasticizers or the like are incorporated. Preferably, at least 12 percent by weight of plasticizer is applied in the PVC mix, wherein possible fillers, such as chalk, are not taken into account.

According to the invention, the floor panel has a decorative upper side. Preferably, the floor panel substantially is composed of a substrate and a top layer. This top layer may serve, amongst others, as a decorative layer and/or as a wear layer. The top layer as such may also consist of a plurality of layers, such as, for example, a decorative layer and a wear layer.

According to the invention, said top layer comprises at least a decor or decorative layer, for example, in the form of a print. Hereby, the appearance of the panel, or the appearance of the decorative surface, can be chosen freely and at choice be given a decorative character. So, for example, may said decorative layer relate to a printed film, more particularly a printed thermoplastic film. Preferably, above the printed film there is a wear layer on the basis of thermoplastic material, for example, on the basis of PVC or soft PVC. Applying a printed film, more particularly a printed thermoplastic film, together with a thermoplastic wear layer offers advantages in respect to the occurrence of wear in such panels. When coupling a plurality of such panels, namely, sometimes small height differences may occur between the decorative upper sides of two coupled panels. In such cases, the top layer is subjected to wear primarily in the edge regions. Using a thermoplastic film and thermoplastic wear layer leads to a restriction of this wear, on account of the fact that it may be made somewhat compressible, for example, as such may consist of PVC or soft PVC.

The top layer preferably comprises at least a translucent or transparent wear layer. According to a possible embodiment, said wear layer is present in the form of a transparent thermoplastic wear layer. Preferably, said wear layer is free from corundum particles ($Al_2O_3$) or other wear-resistant particles.

The top layer may be finished with a lacquer layer, which is applied as a liquid layer on said wear layer and/or decorative layer and subsequently is hardened. Preferably, this relates to a lacquer layer which can be hardened by UV light. Preferably, a lacquer layer is provided above the possible wear layer.

Preferably, the floor panel according to the invention relates to a floor panel, wherein this floor panel, or at least the substrate of the floor panel, substantially is composed of a thermoplastic material, preferably of a soft thermoplastic material.

According to a preferred embodiment, the floor panel, or at least the substrate of the floor panel, substantially is composed of polyvinyl chloride, more particularly of soft polyvinyl chloride, namely PVC comprising plasticizers. Preferably, use is made of PVC obtained from a PVC homopolymer of suspension quality having a K value between 50 and 80, or still better between 60 and 67.

It is noted that the floor panel of the invention preferably has a substrate which comprises plasticizers. According a specific embodiment, it relates to a floor panel, wherein this floor panel has a substrate which comprises plasticizers of the type DINP or DINCH, more particularly with a mass proportion of 20% to 40%, wherein possible filler material is not taken into account.

According to a variant, it relates to a floor panel, wherein this floor panel substantially is free from plasticizers.

As aforementioned, the floor panel of the invention, apart from the synthetic material, may also comprise a filler, preferably limestone or a chalk-like material. Applying a filler in particular has the purpose of restricting the necessary amount of synthetic material and/or of making the panel heavier. In some cases, a heavier panel has the advantage that the panel is more stable and/or will stay at its location more easily during placement and/or after installation.

Preferably, the panel of the invention relates to a rectangular floor panel, either oblong or square.

The present invention is particularly suitable, however, not restrictive, for thin floor panels, more particularly for floor panels having a thickness of 2 millimeters through 6 millimeters and more particularly of 3 millimeters through 5 millimeters.

According to a possible embodiment of the present invention, the floor panel shows the following characteristics:
- The floor panel is substantially composed of, on the one hand, a core or a substrate, wherein this core or this substrate is composed of material forming the basic material of the floor panel, and of, on the other hand, a top layer, in other words, a surface layer, which top layer as such may or may not be composed of a plurality of layers;
- the basic material of the floor panel of which said core is composed, substantially comprises soft thermoplastic material, and wherein this thermoplastic material possibly comprises a filler; and
- said top layer comprises a printed thermoplastic film and a transparent thermoplastic wear layer, wherein said transparent thermoplastic wear layer is thinner than 0.85 millimeters and is free from fillers.

It is clear that the invention also relates to a floor covering which is composed of floor panels as described herein above.

In the case of two reinforcement layers or glass fiber layers, these, seen in cross-section, preferably are situated on opposite sides of the neutral line of the floor panel, unless this would relate to two directly interlinked glass fiber cloths in accordance with said third possible measure. Hereby, the advantage is created that bending forces can be compensated in both directions. This is particular advantageous with relatively supple floor panels, which are substantially manufactured of soft PVC.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF PREFERRED EMBODIMENTS OF THE INVENTION

Figure 1:
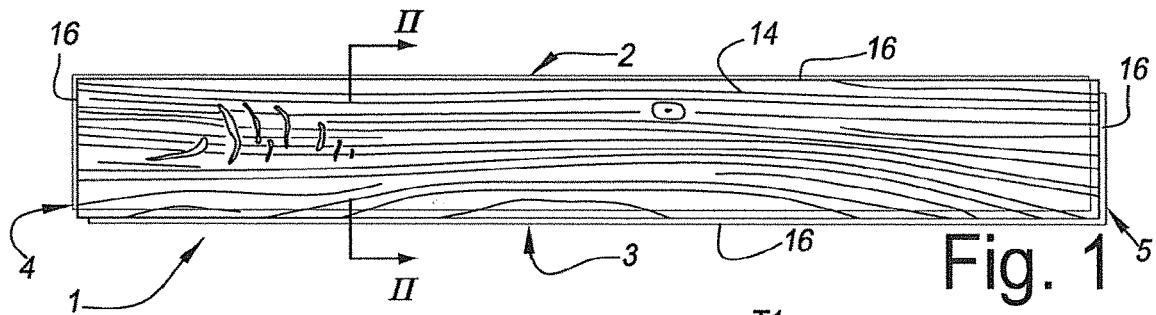
FIG. 1 represents a panel with the characteristics of the invention.

FIG. 1 represents a rectangular and oblong floor panel 1 having a pair of long sides 2-3 and a pair of short sides 4-5.

Figure 2:
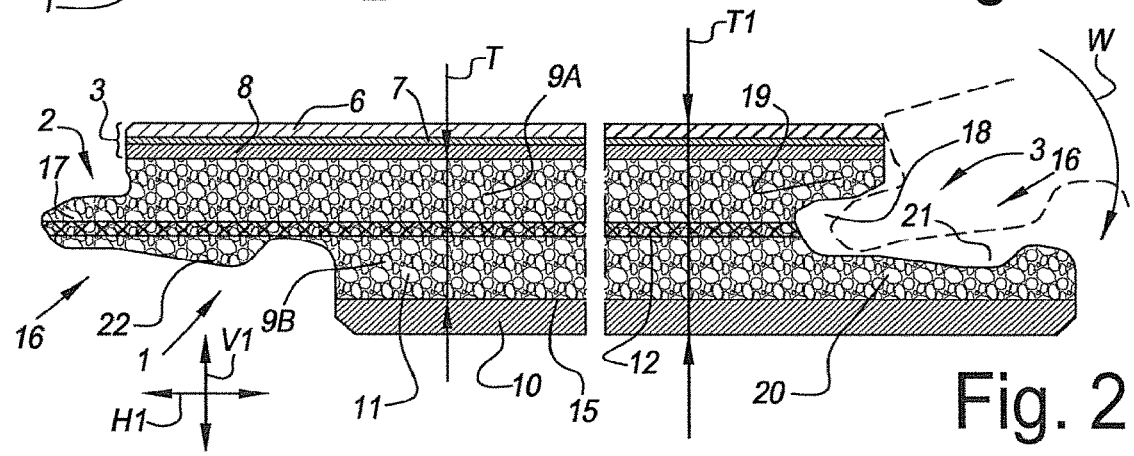
FIG. 2, at a larger scale, represents a cross-section according to line II-II in FIG. 1.

FIG. 2 represents that the respective floor panel 1 is composed of different layers 6-7-8-9A-9B-10.

The substrate 11 is formed by the layers 9A and 9B of thermoplastic material, in this case soft PVC, which substantially consist of strewn and pressed granulate. The respective substrate layer 9 further comprises an enclosed glass fiber fleece 12. Above the respective layers 9A-9B, a top layer 13 is provided, which as such comprises a printed decor film 7 and a transparent wear layer 6 on the basis of thermoplastic material. The top layer 13 further also comprises a back layer 8 situated underneath the decor film 7. In the example, the back layer 8, the decor film 7 as well as the wear layer 6 are made on the basis of polyvinyl chloride.

In the example, the decor film 7 is provided with a print with a wood pattern 14, wherein per panel 1 each time the image of a single wooden plank is provided.

On the underside 15 of the substrate 11, a backing layer 10 is provided, which is also based on soft PVC. According to the invention, it is also possible that one of two said layers 9A-9B, namely the lowermost layer 9B, forms the underside of the panel.

FIG. 2 represents that at least one of the layers 9A-9B is at least present in the middle of the thickness T of the substrate 11. In this case, the respective layers 9A-9B, and the enclosed glass fiber layer 12, form the entire substrate 11.

FIG. 2 further also represents that the respective layers 9A-9B form at least 40 percent and here even more than half of the thickness T1 of the panel 1.

Further, the panel 1 of the example is provided with mechanical coupling means or coupling parts 16 on both opposite edges 2-3. FIG. 2 shows that at least the mechanical coupling means 16 on the long pair of edges 2-3 allow that two of such floor panels 1 can be coupled to each other, such that a locking is created in a vertical direction V1 perpendicular to the plane of the coupled panels 1, as well as in a horizontal direction H1 perpendicular to the coupled edges 2-3 and in the plane of the panels 1. The depicted coupling means 16 show the characteristic that they are substantially made as a tongue 17 and a groove 18 bordered by an upper lip 19 and a lower lip 20, wherein said tongue 17 and groove 18 substantially are responsible for the locking in said vertical direction V1, and wherein the tongue 17 and the groove 18 are provided with additional locking parts 21-22, substantially responsible for the locking in said horizontal direction H1. In this case, the locking parts comprise a protrusion 22 on the underside of the tongue 17 and a cooperating therewith recess 21 in the lower lip 20.

The coupling means 16 represented here allow at least a coupling by means of a pivoting movement W along the respective edges 2-3.

The mechanical coupling means 16 are substantially made in the layers 9A-9B, which enclose the glass fiber layer 12. In the example, they are provided by means of a milling treatment, for example, with rotating tools.

Figure 3:
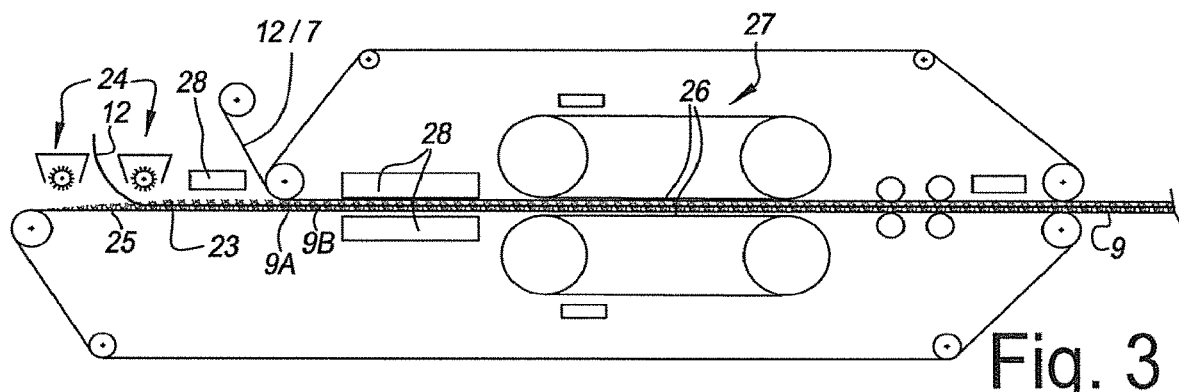
FIG. 3 schematically shows some steps in a method for manufacturing the panel of FIG. 1.

FIG. 3 represents some steps of a method for manufacturing the panel of FIGS. 1 and 2. More particularly, the step is represented of the layers 9A-9B with thermoplastic material, which enclose the glass fiber layer 12.

In the example of FIG. 3, the respective layers 9A-9B are formed on the basis of a granulate 23 of the respective thermoplastic material.

FIG. 3 represents that the granulate 23 of the first layer 9B as well as of the second layer 9A initially is deposed on a transport device 25, on the glass fiber layer 12, respectively, by means of a strewing device 24, after which it is consolidated between the belts 26 of a continuous pressing device 27. Herein, the granulate 23 is transported alongside one or more heating devices 28 and possibly may be cooled again after the press treatment or at the end of the press treatment. By cooling down, it is obtained that the pressed plates, sheets or layers relatively fast are manageable for further processing.

FIG. 3 further also represents that simultaneously with pressing, a further layer, in this case at least the decor film 7, can be provided or incorporated by supplying this in the press treatment on the granulate 23. Instead of a decor foil, this may also relate to, for example, an additional glass fiber layer 12 or a back layer 8, or a wear layer 6. It may also relate to a composition of layers already laminated to each other, such as an already completely or partially composed top layer 3, which, for example, comprises at least a decor film 7 and a wear layer 6, or at least a back layer 8 and a decor film 7, or the back layer 8, the decor film 7 as well as the wear layer 6. A possible superficial lacquer layer preferably is applied after the press treatment. This is not represented here.

Although FIG. 3 represents only two strewing devices 24, of course also further, for example, a third and a fourth, strewing devices can be provided. Further, it is clear that these strewing devices 24 can deposit granulates 23 of a mutually differing composition and/or average particle size.

Figure 4:
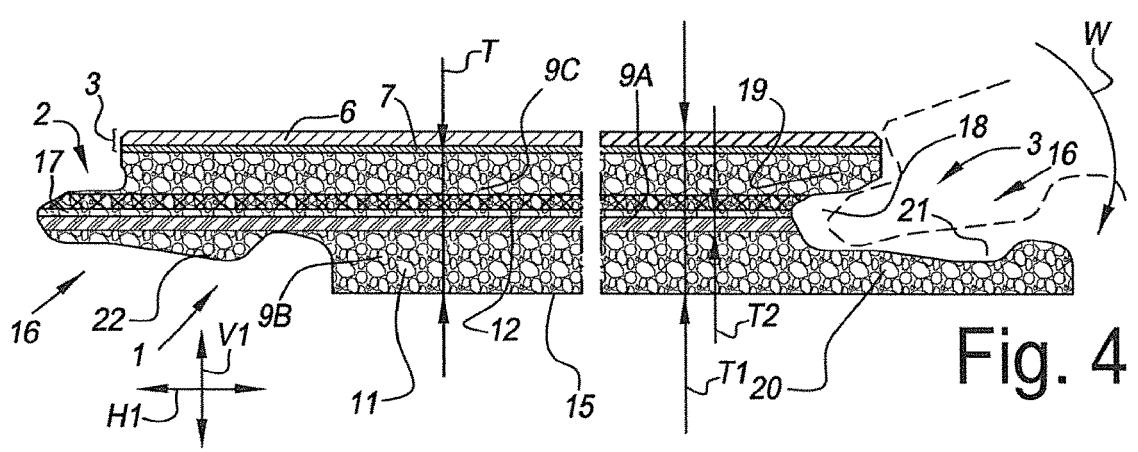
FIGS. 4 and 5, in a view similar to that of FIG. 2, represent other variants.

FIG. 4 represents another example of a panel, wherein the substrate 11 is obtained on the basis of at least two granulates 23, which are mutually differing in composition and/or average particle size. In the example, the layers 9B and 9C are formed on the basis of a granulate comprising PVC with at least 12 percent by weight of plasticizer, whereas the layer 9A situated centrally in the substrate is formed on the basis of a granulate comprising PVC with less than 5 percent by weight of plasticizer or without plasticizer. The glass fiber layer 12 is situated in the layer 9C, which contains a higher amount of plasticizer than layer 9A.

FIG. 4 also shows that the layer 9A can be made thinner than the layers 9B and 9C. In this case, the layer 9A on the basis of the hard or semi-rigid PVC has a thickness T2 which is less than 20 percent of the total thickness T of the substrate 11. This embodiment may lead to a significant reduction of telegraphy or showing of any unevenness in the underlying surface towards the decorative side of the floor panel 1.

Figure 5:
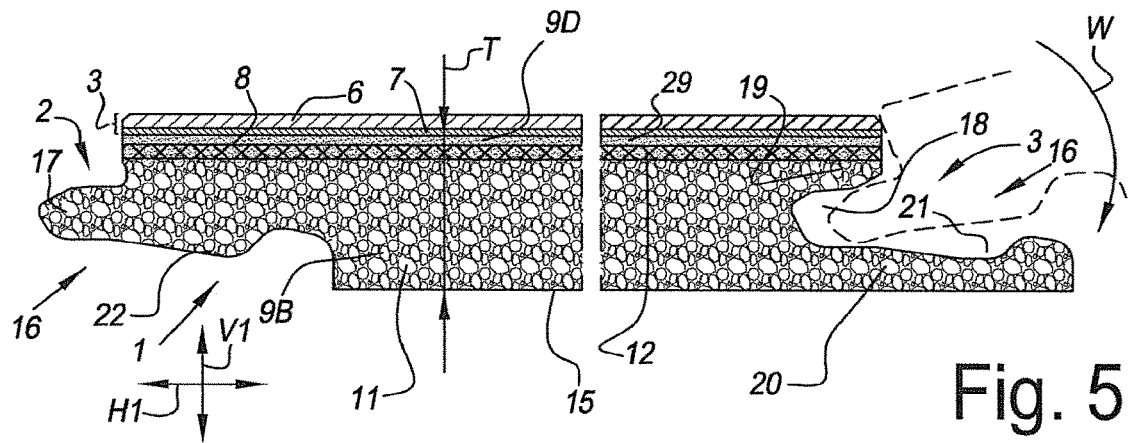

FIG. 5 represents a floor panel 1 with the characteristics of the fifth measure mentioned in the introduction. To this aim, the floor panel 1 comprises a substrate 11 which encloses a glass fiber cloth 12. Herein, the respective glass fiber cloth 12 is enclosed against a substrate portion 9D obtained by means of hardening a plastisol 29. Herein, the plastisol 29 penetrates up into the glass fiber cloth 12. Preferably, the glass fiber cloth is a so-called "non-woven". However, it is not excluded to apply a "woven". Preferably, the glass fiber cloth is chosen such that the first measure mentioned in the introduction is fulfilled, too.

Figure 6:
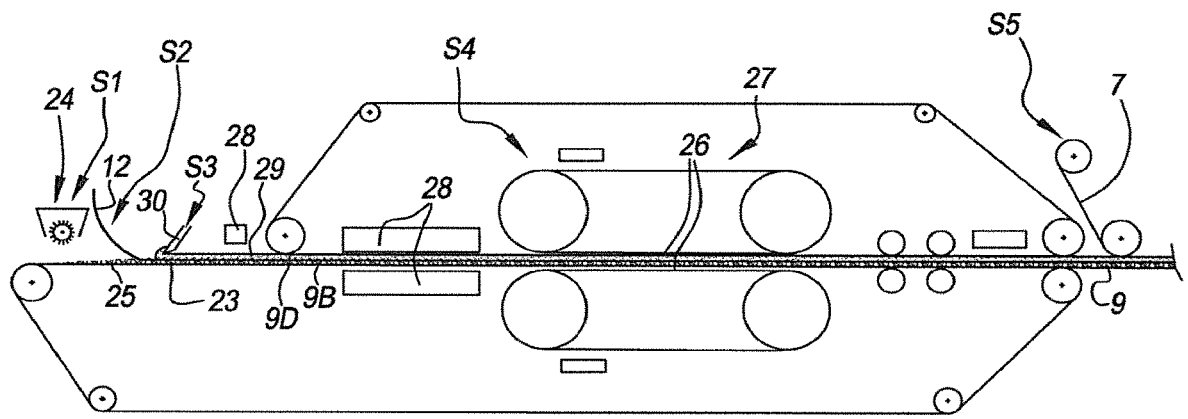
FIG. 6, in a view similar to that of FIG. 3, represents another method for manufacturing floor panels similar to that of FIG. 5.

FIG. 6 represents a method for manufacturing floor panels 1, wherein a floor panel 1, as represented in FIG. 5, can be obtained, or at least a semi-finished product of which one or more of such floor panels 1 can be formed. The method comprises the step S1 of providing a first substrate layer 9B by strewing granulate 23. FIG. 6 shows only one strewing device 24, however, it is evident that two or more successive strewing devices 24 can be applied for realizing the first substrate layer 9B. After step S1 follows the step S2 of providing a glass fiber cloth 12 on the first substrate layer 9B. This preferably relates to a glass fiber cloth having a weight of more than 85 grams per square meter. In a step S3, plastisol 29 is provided on the glass fiber cloth 12. In this case, for this purpose a spreading device 30 or a blade are applied. Of course, other application techniques, such as techniques with one or more roller devices, are not excluded. The plastisol 29 penetrates into the glass fiber cloth 12 and reaches the, in this case rough, surface of the first substrate layer 9B, in which it possibly can penetrate. The applied plastisol 29 is gelled by means of an oven or heating device 28. In the step S4, the whole is pressed, and in step S5, a decor is provided, in this case by applying a printed carrier or a decor film 7 on the pressed whole. For the application of the decor film 7, of course use can be made of a press device. Possibly, subsequently to the decor film 7 or simultaneously to the decor film 7, a transparent wear layer 6 can be applied.

The present invention is in no way limited to the herein above described embodiments, on the contrary may such panels and methods be realized according to various variants, without exceeding the scope of the present invention. Moreover, the panels, instead of floor panels, may also be made as wall panels or ceiling panels or even as furniture panels.

The invention claimed is:

1. A floor panel, comprising:
a substrate;
a decor provided on the substrate;
a wear layer; and
a lacquer layer,
wherein:
the substrate consists essentially of thermoplastic material and filler materials;
the substrate encloses one or more glass fiber cloths such that the substrate extends at least on both sides of the one or more glass fiber cloths;
a total weight of the one or more glass fiber cloths is between 150 grams per square meter and 180 grams per square meter;
the floor panel is a first floor panel;
the first floor panel is rectangular and oblong and coupling parts are provided on two or more opposite edges of the first floor panel, whereby one of the edges of the first floor panel can be coupled to an edge of a second floor panel such that the first floor panel and the second floor panel are locked together: (i) in a horizontal direction perpendicular to the one of the edges of the first floor panel and the edge of the second floor panel; (ii) in a plane of the first floor panel and the second floor panel; and (iii) in a vertical direction perpendicular to the plane of the first floor panel and the second floor panel;

the coupling parts include a tongue, a groove and locking parts, the locking parts including a protrusion at an underside of the tongue and a cooperating recess in a lower lip bordering the groove, the groove being further bordered by an upper lip, and the lower lip including a portion that extends horizontally beyond the upper lip;

the one or more glass fiber cloths extend along a horizontal plane, the horizontal plane being situated at a level above an entirety of the portion of the lower lip that extends horizontally beyond the upper lip;

at least one of the one or more glass fiber cloths is enclosed in a first substrate portion which comprises a locally higher amount of plasticizer in comparison to a second substrate portion of the floor panel;

the substrate comprises polyvinyl chloride obtained from a PVC homopolymer of suspension quality having a K value between 50 and 80;

the wear layer comprises a thermoplastic material and is above the substrate;

the lacquer layer is above the wear layer;

the floor panel is for a floating floor covering;

the thermoplastic material of the substrate extends through the one or more glass fiber cloths;

the one or more glass fiber cloths are situated outside a central line of the substrate; and the level of the horizontal plane is above an entirety of the lower lip and below an entirety of the upper lip.

2. The floor panel of claim 1, wherein the substrate encloses only one glass fiber cloth.

3. The floor panel of claim 1, wherein the substrate consists essentially of a granulate of the thermoplastic material and filler materials.

4. The floor panel of claim 1, wherein the one or more glass fiber cloths are non-woven glass fiber layers.

5. The floor panel of claim 1, wherein:
the one or more glass fiber cloths are covered with an adherence material or a stabilizing material; and
a composition of the adherence material or a composition of the stabilizing material is different from a composition of the thermoplastic material of the substrate.

6. The floor panel of claim 5, wherein the one or more glass fiber cloths are covered with a thermosetting material.

7. The floor panel of claim 1, wherein the polyvinyl chloride has an amount of plasticizer which is higher than 12 wt % based on a total of the polyvinyl chloride and the plasticizer.

8. The floor panel of claim 1, wherein the filler materials comprise chalk or limestone.

9. The floor panel of claim 1, wherein the filler materials form at least 40 percent by weight of the substrate.

10. The floor panel of claim 7, wherein the amount of plasticizer is higher than 20 wt % based on the total of the polyvinyl chloride and the plasticizer.

11. The floor panel of claim 9, wherein the filler materials form more than 50 percent by weight of the substrate.

12. A floor panel, comprising:
a substrate;
a decor provided on the substrate;
a wear layer; and
a lacquer layer,
wherein:
the substrate consists essentially of thermoplastic material and filler materials;
the substrate encloses one or more glass fiber cloths such that the substrate extends at least on both sides of the one or more glass fiber cloths;
at least one of the one or more glass fiber cloths is covered with a thermosetting material;
the floor panel is a first floor panel;
the first floor panel is rectangular and oblong and coupling parts are provided on two or more opposite edges of the first floor panel, whereby one of the edges of the first floor panel can be coupled to an edge of a second floor panel such that the first floor panel and the second floor panel are locked together: (i) in a horizontal direction perpendicular to the one of the edges of the first floor panel and the edge of the second floor panel; (ii) in a plane of the first floor panel and the second floor panel; and (iii) in a vertical direction perpendicular to the plane of the first floor panel and the second floor panel;
the coupling parts include a tongue, a groove and locking parts, the locking parts including a protrusion at an underside of the tongue and a cooperating recess in a lower lip bordering the groove, the groove being further bordered by an upper lip, and the lower lip including a portion that extends horizontally beyond the upper lip;
the one or more glass fiber cloths extend along a horizontal plane, the horizontal plane being situated at a level above an entirety of the portion of the lower lip that extends horizontally beyond the upper lip;
at least one of the one or more glass fiber cloths is enclosed in a first substrate portion which comprises a locally higher amount of plasticizer in comparison to a second substrate portion of the floor panel;
the substrate comprises polyvinyl chloride obtained from a PVC homopolymer of suspension quality having a K value between 50 and 80;
the wear layer comprises a thermoplastic material and is above the substrate;
the lacquer layer is above the wear layer;
the floor panel is for a floating floor covering;
the thermoplastic material of the substrate extends through the one or more glass fiber cloths;
a total weight of the one or more glass fiber cloths is between 150 grams per square meter and 180 grams per square meter;
the one or more glass fiber cloths are situated outside a central line of the substrate; and
the level of the horizontal plane is above an entirety of the lower lip and below an entirety of the upper lip.

13. A floor panel, comprising:
a substrate;
a decor provided on the substrate;
a wear layer; and
a lacquer layer,
wherein:
the substrate consists essentially of thermoplastic material and filler materials;
the substrate encloses at least two directly interlinked glass fiber cloths such that the substrate extends at least on both sides of the at least two directly interlinked glass fiber cloths;

the at least two directly interlinked glass fiber cloths are interlinked such that the at least two directly interlinked glass fiber cloths are connected by: (i) an adherence material which has a composition that is different from a composition of the thermoplastic material; or (ii) a stabilizing material which has a composition that is different from the composition of the thermoplastic material;

the at least two directly interlinked glass fiber cloths are enclosed in a first substrate portion which comprises a locally higher amount of plasticizer in comparison to a second substrate portion of the floor panel;

the substrate comprises polyvinyl chloride obtained from a PVC homopolymer of suspension quality having a K value between 50 and 80;

the wear layer comprises a thermoplastic material and is above the substrate;

the lacquer layer is above the wear layer;

the floor panel is for a floating floor covering;

the floor panel is a first floor panel;

the first floor panel is rectangular and oblong and coupling parts are provided on two or more opposite edges of the first floor panel, whereby one of the edges of the first floor panel can be coupled to an edge of a second floor panel such that the first floor panel and the second floor panel are locked together: (i) in a horizontal direction perpendicular to the one of the edges of the first floor panel and the edge of the second floor panel; (ii) in a plane of the first floor panel and the second floor panel; and (iii) in a vertical direction perpendicular to the plane of the first floor panel and the second floor panel;

the thermoplastic material of the substrate extends through the one or more glass fiber cloths;

a total weight of the one or more glass fiber cloths is between 150 grams per square meter and 180 grams per square meter;

the coupling parts comprise a tongue, a groove and locking parts, wherein the locking parts comprise a protrusion at an underside of the tongue and a cooperating recess in a lower lip bordering the groove, wherein the groove is further bordered by an upper lip, and wherein the lower lip comprises a portion that horizontally extends beyond the upper lip; and the one or more glass fiber cloths are situated outside a central line of the substrate and extend along a horizontal plane, the horizontal plane being situated at a level above an entirety of the lower lip and below an entirety of the upper lip.

14. The floor panel of claim 13, wherein the at least two directly interlinked glass fiber cloths include at least one woven glass fiber layer and at least one non-woven glass fiber layer.

15. The floor panel of claim 13, wherein the at least two directly interlinked glass fiber cloths are connected by the adherence material and the stabilizing material.

16. A floor panel, comprising:
a substrate;
a decor provided on the substrate;
a wear layer; and
a lacquer layer,
wherein:
the substrate consists essentially of polyvinyl chloride, plasticizer and filler materials;

the substrate encloses one or more glass fiber cloths such that the substrate extends at least on both sides of the one or more glass fiber cloths;

at least one of the one or more glass fiber cloths is enclosed in a first substrate portion which comprises a locally higher amount of plasticizer in comparison to a second substrate portion of the floor panel;

the floor panel is a first floor panel;

the first floor panel is rectangular and oblong and coupling parts are provided on two or more opposite edges of the first floor panel, whereby one of the edges of the first floor panel can be coupled to an edge of a second floor panel such that the first floor panel and the second floor panel are locked together: (i) in a horizontal direction perpendicular to the one of the edges of the first floor panel and the edge of the second floor panel; (ii) in a plane of the first floor panel and the second floor panel; and (iii) in a vertical direction perpendicular to the plane of the first floor panel and the second floor panel;

the coupling parts include a tongue, a groove and locking parts, the locking parts including a protrusion at an underside of the tongue and a cooperating recess in a lower lip bordering the groove, the groove being further bordered by an upper lip, and the lower lip including a portion that extends horizontally beyond the upper lip;

the one or more glass fiber cloths extend along a horizontal plane, the horizontal plane being situated at a level above an entirety of the portion of the lower lip that extends horizontally beyond the upper lip;

the substrate comprises the polyvinyl chloride which is obtained from a PVC homopolymer of suspension quality having a K value between 50 and 80;

the wear layer comprises a thermoplastic material and is above the substrate;

the lacquer layer is above the wear layer;

the floor panel is for a floating floor covering;

the thermoplastic material of the substrate extends through the one or more glass fiber cloths;

a total weight of the one or more glass fiber cloths is between 150 grams per square meter and 180 grams per square meter;

the one or more glass fiber cloths are situated outside a central line of the substrate, and the level of the horizontal plane is above an entirety of the lower lip and below an entirety of the upper lip.

* * * * *